United States Patent
Hsueh et al.

(10) Patent No.: US 8,480,265 B2
(45) Date of Patent: Jul. 9, 2013

(54) LENS STRUCTURE

(75) Inventors: Han-Tsung Hsueh, Taipei County (TW); Jia-Chyi Feng, Taipei County (TW)

(73) Assignees: Cal-Comp Electronics & Communications Company Limited, New Taipei (TW); Kinpo Electronics, Inc., New Taipei (TW)

( * ) Notice: Subject to any disclaimer, the term of this patent is extended or adjusted under 35 U.S.C. 154(b) by 74 days.

(21) Appl. No.: 13/046,697

(22) Filed: Mar. 12, 2011

(65) Prior Publication Data

US 2011/0228542 A1 Sep. 22, 2011

Related U.S. Application Data

(60) Provisional application No. 61/375,860, filed on Aug. 22, 2010.

(30) Foreign Application Priority Data

Mar. 16, 2010 (TW) ................ 99107625 A

(51) Int. Cl.
*F21V 7/07* (2006.01)

(52) U.S. Cl.
USPC ............... 362/296.05; 362/309; 362/311.02

(58) Field of Classification Search
USPC .......... 362/296.05, 308–310, 311.02, 311.06, 362/327, 329, 331, 335, 340, 800; 313/498, 313/500, 512; 359/798–801
See application file for complete search history.

(56) References Cited

U.S. PATENT DOCUMENTS

| 6,616,305 | B1 | 9/2003 | Simon |
| 6,951,418 | B2 | 10/2005 | Rizkin et al. |
| 7,329,029 | B2 * | 2/2008 | Chaves et al. ................. 362/329 |
| 7,347,590 | B2 * | 3/2008 | Lee et al. ....................... 362/327 |
| 7,445,359 | B2 * | 11/2008 | Chang ........................... 362/331 |
| 7,540,635 | B2 | 6/2009 | Kim et al. |
| 7,753,561 | B2 * | 7/2010 | Chaves et al. ................. 362/308 |
| 7,934,858 | B2 * | 5/2011 | Nakamura ............... 362/311.09 |
| 8,075,147 | B2 * | 12/2011 | Chaves et al. .................... 362/84 |
| 2005/0225988 | A1 | 10/2005 | Chaves et al. |

(Continued)

FOREIGN PATENT DOCUMENTS

EP 2031296 3/2009

OTHER PUBLICATIONS

"Search Report of Europe Counterpart Application", issued on Mar. 16, 2011, p. 1-p. 7.
"First Office Action of China Counterpart Application", issued on May 31, 2012, p. 1-p. 4.

*Primary Examiner* — Hargobind S Sawhney
(74) *Attorney, Agent, or Firm* — Jianq Chyun IP Office

(57) ABSTRACT

A lens structure adapted for guiding a light from a light source to a plurality of directions is provided. The lens structure includes a base, a pillar, and an umbrella-shaped body. The base has a containing pit adapted for containing the light source. The pillar is connected to the base. The pillar has a central axis and a first curved surface, in which the first curved surface surrounds the central axis symmetrically. The umbrella-shaped body is connected to the pillar and has a second curved surface and a third curved surface surrounding the central axis symmetrically. The second and the third curved surfaces are located on a top portion of the umbrella-shaped body and next to each other.

12 Claims, 6 Drawing Sheets

U.S. PATENT DOCUMENTS

| | | |
|---|---|---|
| 2006/0262424 A1 | 11/2006 | Choi |
| 2009/0128921 A1 | 5/2009 | Roth |
| 2009/0129097 A1 | 5/2009 | Ewert et al. |
| 2010/0027271 A1 | 2/2010 | Wilcox et al. |

* cited by examiner

LENS STRUCTURE

CROSS-REFERENCE TO RELATED APPLICATION

This application claims the priority benefit of U.S. provisional application Ser. No. 61/375,860, filed on Aug. 22, 2010, all disclosures are incorporated therewith. This application also claims the priority of Taiwan application serial no. 99107625, filed Mar. 16, 2010. All disclosure of the Taiwan application is incorporated herein by reference.

BACKGROUND OF THE INVENTION

1. Field of the Invention

The invention relates generally to a lens structure, and more particularly to a dispersive lens structure.

2. Description of Related Art

As semiconductor technologies progress, the luminance and the light emitting efficiency of a light emitting diode (LED) continually improve. Due to advantages such as fast response, high reliability, low power consumption, low pollution, low driving voltage, and mercury free, LEDs are being widely applied in many fields.

Although the LED may be used as a spot light source, the LED light source tends to characteristically exhibit a highly directional property. Therefore, the LED may not be directly applied in flood illumination equipments. Accordingly, a pertinent issue is overcoming a mismatch between an illumination property of the LED and a currently demanded illumination requirement, thereby enabling the LED for use in flood illumination.

SUMMARY OF THE INVENTION

An aspect of the invention provides a lens structure having a property capable of transmitting an output light of a directional light source into a predetermined viewing range.

According to an embodiment of the invention, a lens structure is adapted for guiding a light from a light source to a plurality of directions. The lens structure includes a base, a pillar, and an umbrella-shaped body. The base has a containing pit adapted to contain the light source. The pillar is connected to the base. The pillar has a central axis and a first curved surface, in which the first surface surrounds the central axis symmetrically. The umbrella-shaped body is connected to the pillar. The umbrella-shaped body has a second curved surface and a third curved surface surrounding the central axis symmetrically. The second curved surface and the third curved surface are located on a top portion of the umbrella-shaped body and next to each other.

According to an embodiment of the invention, the first curved surface is a total internal reflection (TIR) surface configured to reflect the light from the light source towards the umbrella-shaped body.

According to an embodiment of the invention, on a projection plane with the central axis serving as a normal, an orthogonal projection of the second curved surface onto the projection plane is surrounded by an orthogonal projection of the third curved surface onto the projection plane. According to an embodiment of the invention, the second curved surface is a convex surface or a concave surface, and the third curved surface is a convex surface or a concave surface.

According to an embodiment of the invention, wherein a portion of a light emitted to the second curved surface transmits through the second curved surface, and another portion of the light emitted to the second curved surface is reflected by the second curved surface towards a side edge of the umbrella-shaped body.

According to an embodiment of the invention, wherein a portion of a light emitted to the third curved surface transmits through the third curved surface, and another portion of the light emitted to the third curved surface is reflected by the third curved surface towards a side edge of the umbrella-shaped body.

According to an embodiment of the invention, the umbrella-shaped body further includes a first slanted surface and a second slanted surface surrounding the central axis symmetrically and respectively located at a side edge of the umbrella-shaped body. The first slanted surface is located next to the third curved surface, and the second slanted surface is located between the first slanted surface and the first curved surface. Moreover, the first slanted surface intersects with the second slanted surface to form an included angle.

According to an embodiment of the invention, the umbrella-shaped body further includes a third slanted surface surrounding the central axis symmetrically and located on a bottom portion of the umbrella-shaped body. The third slanted surface and the projection plane form an acute angle of 0 degree to 15 degrees.

According to an embodiment of the invention, the lens structure further includes a plurality of fixing holes disposed on the base.

According to an embodiment of the invention, the lens structure further includes a plurality of adhesive portions disposed on the base.

According to an embodiment of the invention, the containing pit is a portion of a ball body, and the light source is located on the central axis.

According to an embodiment of the invention, the lens structure further includes a bent surface located between the first curved surface of the pillar and the base.

In summary, according to embodiments of the invention, the lens structure employs the aforesaid surfaces such that light from the base can be collected at the umbrella-shaped body, thereby uniformly emitting light out of the lens structure. Accordingly, the lens structure is capable of emitting light into a viewing range of greater than 180 degrees.

In order to make the aforementioned and other features and advantages of the invention more comprehensible, embodiments accompanying figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1A:
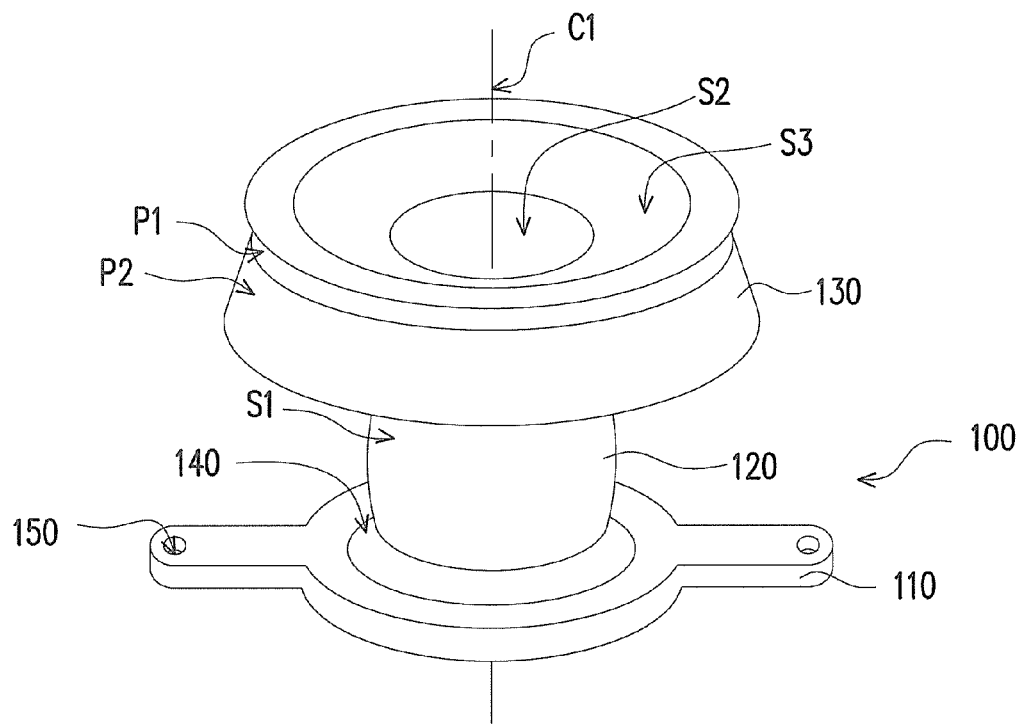
FIG. 1A and FIG. 1B are three-dimensional perspective views from different viewing angles of a lens structure in accordance with an embodiment of the invention.
Figure 1B:
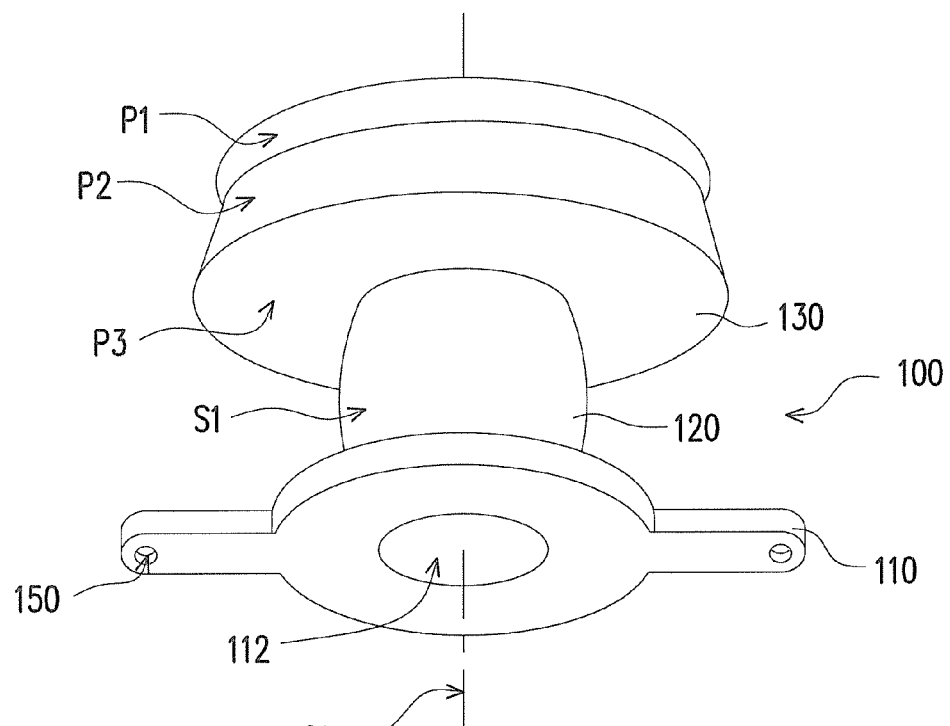
Figure 2A:
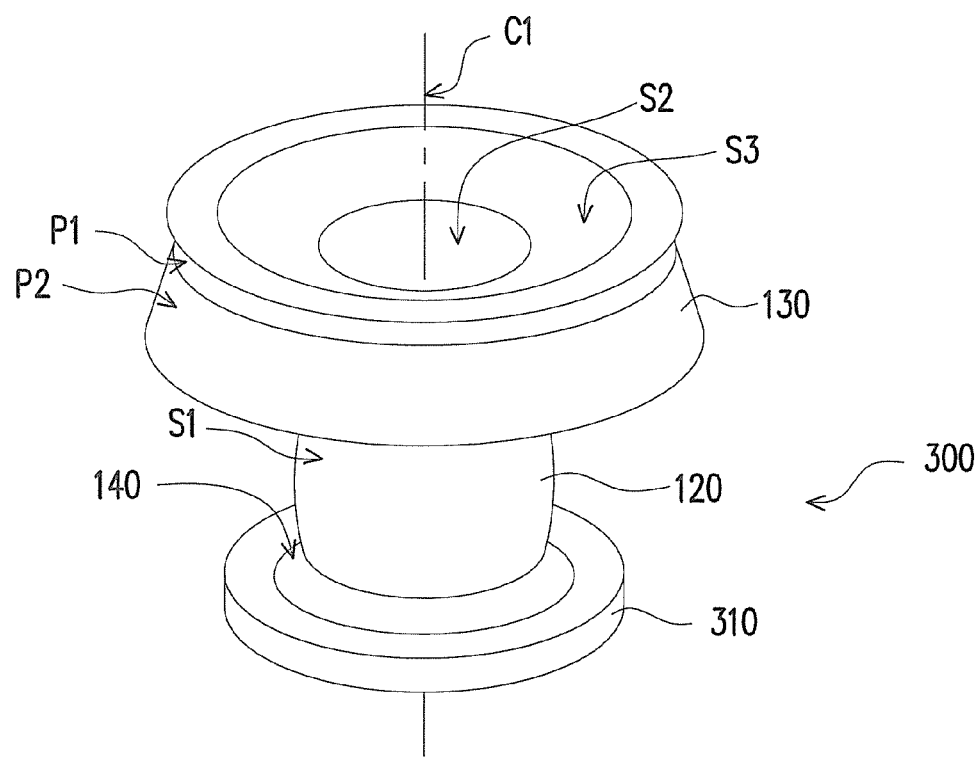
FIG. 2A and FIG. 2B are three-dimensional perspective views from different viewing angles of a lens structure in accordance with another embodiment of the invention.
Figure 2B:
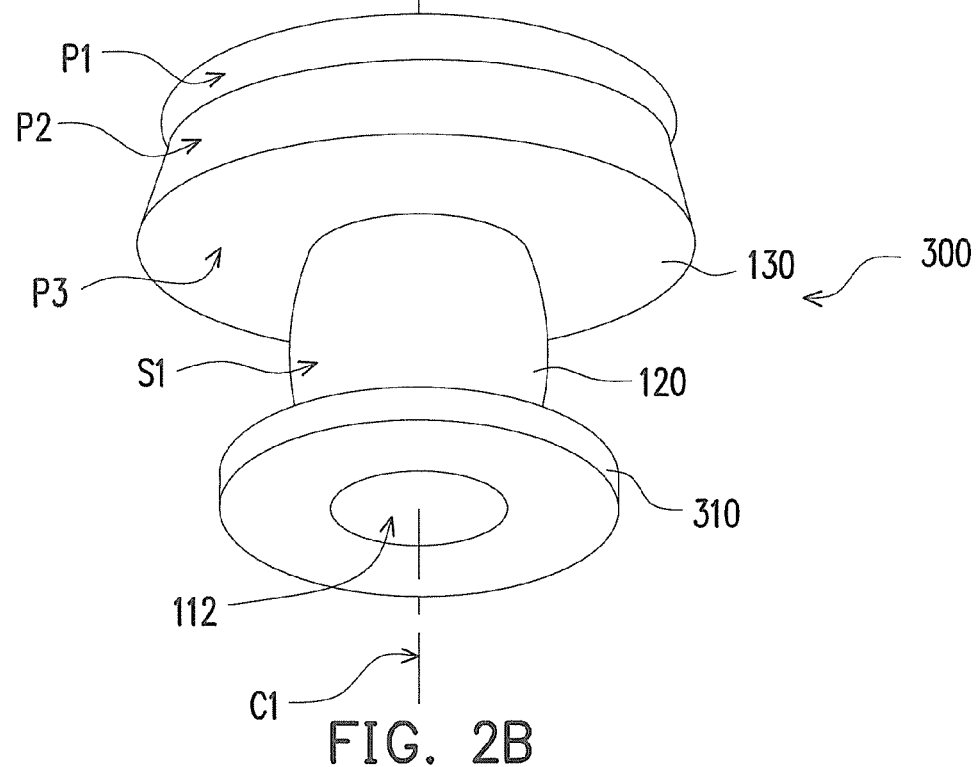
Figure 3:
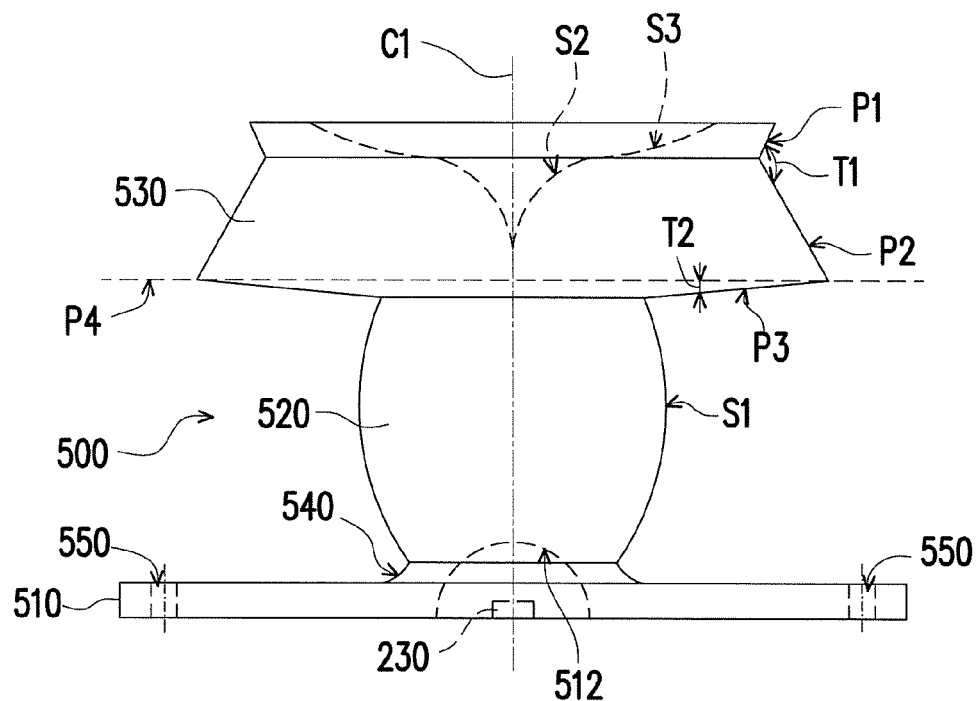
FIG. 3 is a side view of the lens structure depicted in FIG. 1A.

FIG. 1A and FIG. 1B are three-dimensional perspective views from different viewing angles of a lens structure in accordance with an embodiment of the invention. FIG. 2A and FIG. 2B are three-dimensional perspective views from different viewing angles of a lens structure in accordance with another embodiment of the invention. FIG. 3 is a side view of the lens structure depicted in FIG. 1A. Referring concurrently to FIGS. 1A-3, a lens structure 100 is adapted for guiding a light from a light source 200 to a plurality of directions. In the present embodiment, the lens structure 100 includes a base 110, a pillar 120, and an umbrella-shaped body 130. The base 110 has a containing pit 112 adapted to contain the light source 200. In the present embodiment, the light source 200 is a light emitting diode (LED), for example, although the present embodiment is not limited thereto. Any directional light source may be suitable for application in the present embodiment.

The pillar 120 is connected to the base 110. The pillar 120 has a central axis C1 and a first curved surface S1, in which the first curved surface 51 surrounds the central axis C1 symmetrically. The umbrella-shaped body 130 is connected to the pillar 120. The umbrella-shaped body 130 has a second curved surface S2, a third curved surface S3, a slanted surface P1, and a second slanted surface P2 surrounding the central axis C1 symmetrically. The second curved surface S2 and the third curved surface S3 are located on a top portion of the umbrella-shaped body 130 and next to each other. The first slanted surface P1 and the second slanted surface P2 are located on a side edge of the umbrella-shaped body 130, and the first slanted surface P1 intersects the second slanted surface P2 to form an included angle T1.

In light of the foregoing description, by using the lens structure 100 according to an embodiment of the invention, a light emitted by the light source 200 can be guided from the base 110 to umbrella-shaped body 130, and the light is emitted from each of the optical surfaces S2, S3, P1, and P2 out of the lens structure 100. Therefore, according to an embodiment of the invention, the lens structure 100 can generate a light emission effect of greater than 180 degrees viewing range.

However, the present embodiment does not restrict the included angle T1 between the first slanted surface P1 and the second slanted surface P2. In another embodiment of the invention (not drawn), the included angle T1 may also be 180 degrees. In other words, the first slanted surface P1 may be co-planar with the second slanted surface P2, and the lens structure 100 can still achieve the light emission effect of greater than 180 degrees viewing range.

Figure 4:
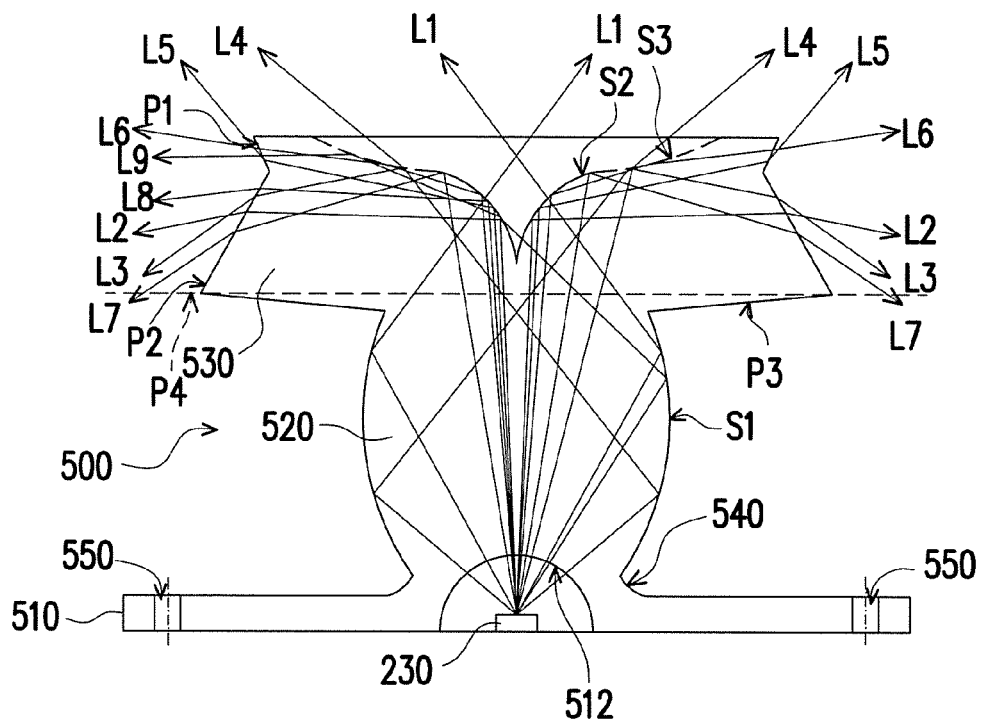
FIG. 4 is a schematic diagram illustrating a light path of a light source in the lens structure depicted in FIG. 1A.

FIG. 4 is a schematic diagram illustrating a light path of a light source in the lens structure depicted in FIG. 1A, and only a representative portion of the light path is described hereafter. For ease of describing the light path depicted in FIG. 4, FIGS. 5-7 respectively illustrate different portions of the light path depicted in FIG. 4. Referring to FIGS. 3-7 concurrently, in the present embodiment, the containing pit 112 is a portion of a ball body, and the light source 200 is located on the central axis C1.

Figure 5:
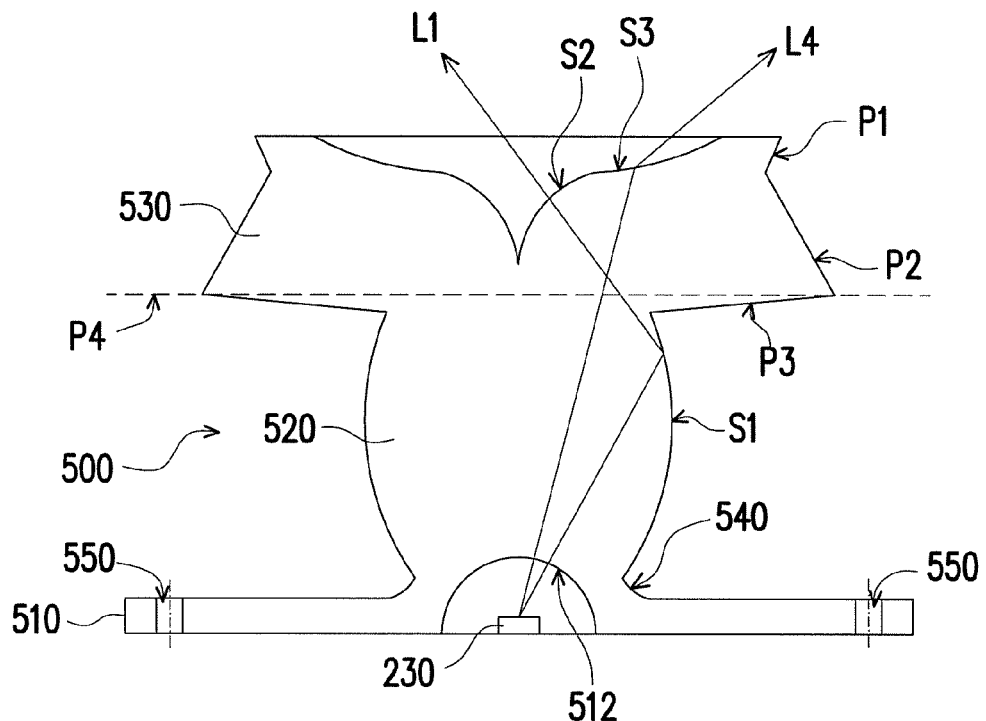
FIGS. 5 to 7 are schematic diagrams respectively illustrating different portions of the light path depicted in FIG. 4.
Figure 6:
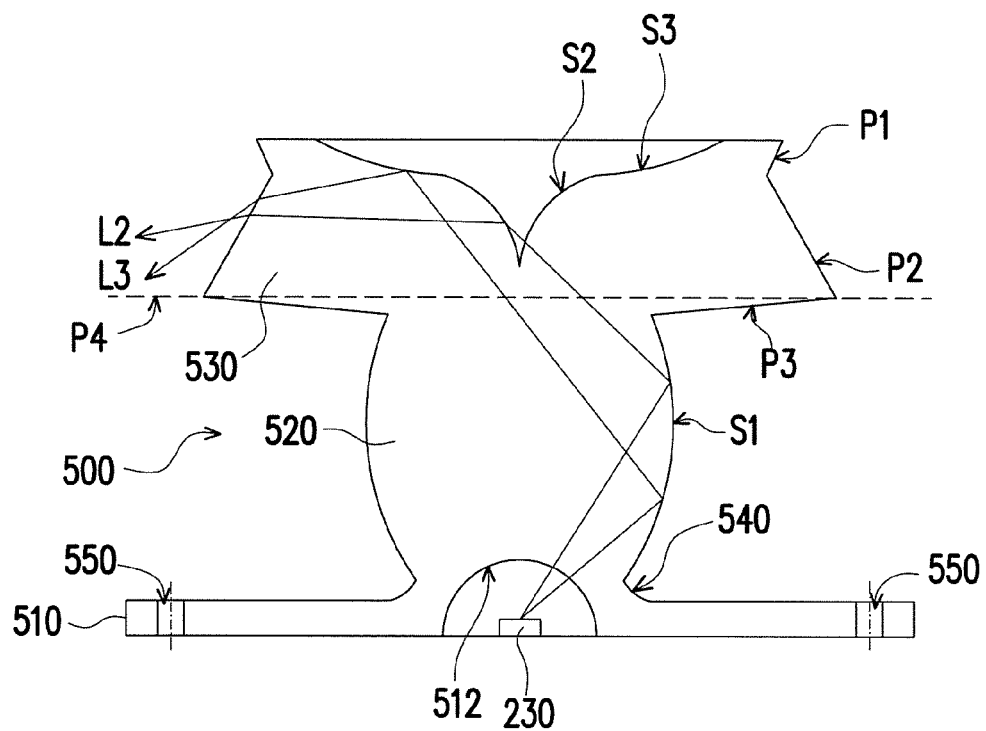

In addition, the first curved surface S1 is a total internal reflection (TIR) surface used for reflecting light from the light source 200 towards the umbrella-shaped body 130, as shown by a light L1 depicted in FIG. 5 as well as a light L2 and a light L3 depicted in FIG. 6. A light originating from the containing pit 112 and emitted towards the first curved surface S1 is reflected by the first curved surface S1 and directed towards the umbrella-shaped body 130. Accordingly, the pillar 120 of the lens structure 100 is capable of collecting light towards the umbrella-shaped body 130.

In the present embodiment, on a projection plane P4 with the central axis C1 serving as a normal, an orthogonal projection of the second curved surface S2 onto the projection plane P4 is surrounded by an orthogonal projection of the third curved surface S3 onto the projection plane P4. In other words, on the umbrella-shaped body 130 of the lens structure 100, the second curved surface S2 is substantially surrounded by the third surface S3.

It should be noted that, a portion of a light emitted to the second curved surface S2 transmits through the second curved surface S2, as shown by the light L1 depicted in FIG. 5 and the light L2 depicted in FIG. 6. At this moment, another portion of the light emitted to the second curved surface S2 is reflected by the second curved surface S2 towards a side edge of the umbrella-shaped body 130, as shown by the light L2 depicted in FIG. 6 as well as a light L5, a light L7, and a light L8 depicted in FIG. 7. Herein, the light L2 transmits through a side of the second curved surface S2 towards another side thereof, then the light L2 is emitted towards the side edge of the umbrella-shaped body 130.

Figure 7:
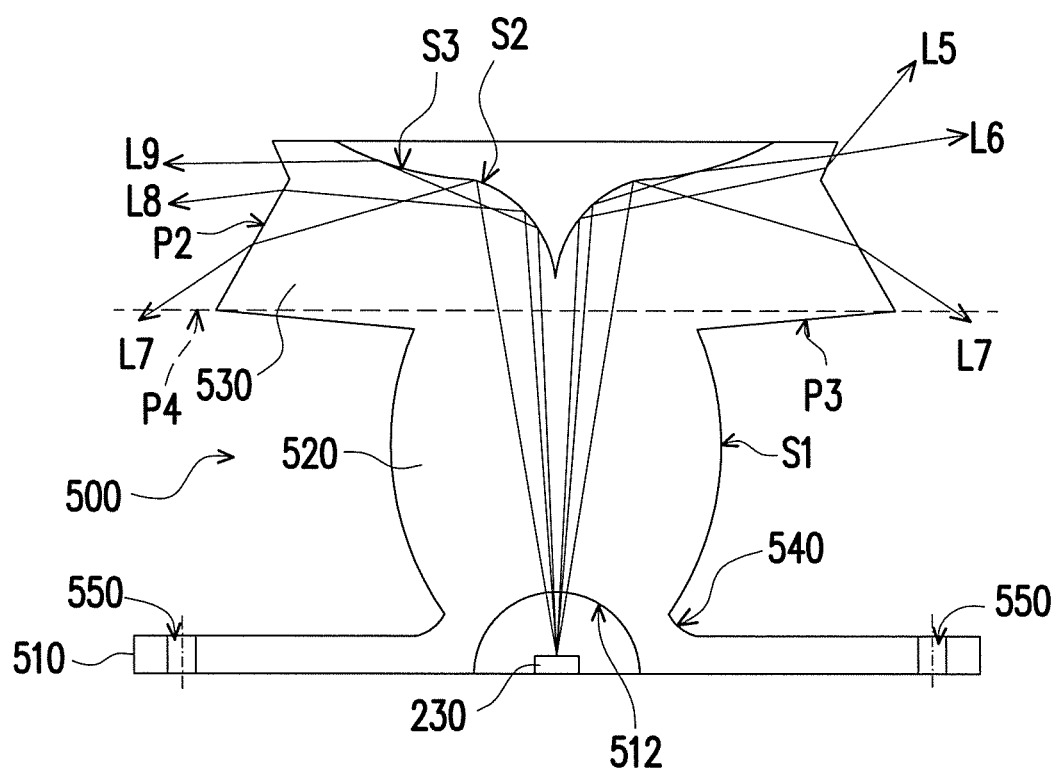

Moreover, a portion of the light emitted to the second curved surface S2 is first emitted towards the third curved surface S3, then reflected towards a side edge of the umbrella-shaped body 130, as shown by a light L6 and a light L9 depicted in FIG. 7.

Similarly, a portion of a light emitted to the third curved surface S3 transmits through the third curved surface S3, as shown by a light L4 depicted in FIG. 5. Another portion of the light emitted to the third curved surface S3 is reflected towards a side edge of the umbrella-shaped body 130, as shown by the light L3 depicted in FIG. 6 as well as the light L6 and the light L9 depicted in FIG. 7.

Therefore, the second and third curved surfaces S2 and S3 according to the present embodiment simultaneously possess capabilities for allowing light to transmit and reflect. Not only can a portion of light emit out of the lens structure 100 through the top portion of the umbrella-shaped body 130, but concurrently another portion of light may be guided towards the side edges of the umbrella-shaped body 130. In the present embodiment, the second curved surface is a convex surface, whereas the third curved surface is a concave surface. However, the present embodiment is not limited thereto. In another embodiment of the invention (not drawn), the third curved surface may be a convex surface, and a designer may adjust the curved surfaces according to the light emitted from the containing pit 112 and the pillar 120.

Figure 8:
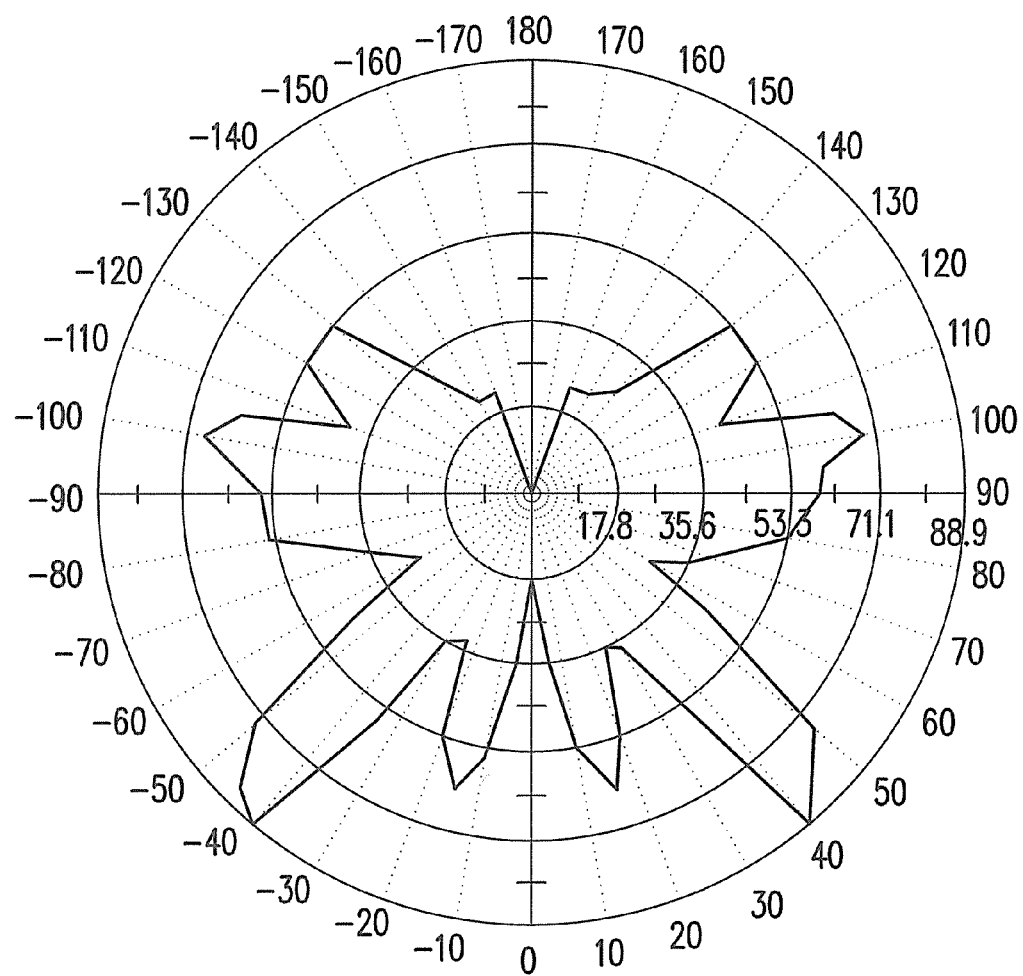
FIG. 8 is an illuminance distribution diagram generated by a light source through the lens structure depicted in FIG. 4.

Referring again to FIGS. 3 and 4, at a side edge of the umbrella-shaped body 130, the first slanted surface P1 is located next to the third curved surface S3, and the second slanted surface P2 is located between the first slanted surface P1 and the first curved surface S1. Moreover, the included angle T1 is formed between the first slanted surface P1 and the second slanted surface P2. Accordingly, the first and second slanted surfaces P1 and P2 are capable of uniformly emitting light from the second and third curved surfaces S2 and S3 out towards the side edges of the lens structure 100. FIG. 8 is an illuminance distribution diagram generated by a light source through the lens structure depicted in FIG. 4, in which a radial coordinate has units of luminous intensity, and an arc coordinate represents an angular range of the light emission generated by the light source through the lens structure. Please refer to FIGS. 4 and 8 together.

The light emission effects generated by each of the optical paths depicted in FIG. 4 can be illustrated in FIG. 8. More specifically, after the first curved surface S1 of the pillar 120 collects the light emitted from the containing pit 112 of the base 110, light may be uniformly emitted out of the lens structure 100 through the second curved surface S2, the third curved surface S3, the first slanted surface P1, and the second slanted surface P2 of the umbrella-shaped body 130, and an emission range is greater than 180 degrees.

Additionally, referring again to FIGS. 2 and 3, the umbrella-shaped body 130 further includes a third slanted surface P3 surrounding the central axis C1 symmetrically and located between the first curved surface S1 and the second slanted surface P2. In the present embodiment, the third slanted surface P3 and the projection plane P4 form an acute angle T2, and a range of the acute angle T2 is 0 degree to 15 degrees. The acute angle T2 is used as a draft angle of the lens structure 100, in order to facilitate separation of a molded product and a mold after the lens structure 100 has been plastic injection molded. Additionally, referring again to FIGS. 1 and 3, the lens structure 100 further includes a bent surface 140 surrounding the central axis C1 symmetrically and located between the first curved surface S1 of the pillar 120 and the base 110. The bent surface 140 is fabricated to facilitate separation with the mold after the lens structure 100 is plastic molded.

Furthermore, referring again to FIGS. 1A and 1B, in the present embodiment, the lens structure 100 further includes two fixing holes 150 located on the base 110, configured to facilitate a fixing member (not drawn) fixing the lens structure 100 on a platform (not drawn). Moreover, the fixing holes 150 may also be alternatively designed to form an adhesive portion of the lens structure 100, or a bottom portion of the base 110 may serve as the adhesive portion of the lens structure 100 (e.g., a base 310 of a lens structure 300 depicted in FIGS. 2A and 2B). The bases 110 and 310 of the lens structures 100 and 300 can accordingly be attached on a platform (not drawn). However, the present embodiment does not limit the installation manner of the lens structure 100.

In light of the foregoing, according to embodiments of the invention, the lens structure uses the first curved surface of the pillar to collect light from the base towards the umbrella-shaped body, and thereby employs the top portion of the umbrella-shaped body and the slanted surfaces located at the side edges of the umbrella-shaped body so that light can be uniformly emitted out of the lens structure through the top portion and side edges of the umbrella-shaped body. Accordingly, the lens structure has a dispersive property capable of emitting a light generated by a directional light source into a predetermined viewing range of greater than 180 degrees.

Although the invention has been described with reference to the above embodiments, it will be apparent to one of the ordinary skill in the art that modifications to the described embodiment may be made without departing from the spirit of the invention. Accordingly, the scope of the invention will be defined by the attached claims not by the above detailed descriptions.

What is claimed is:

1. A lens structure configured to guide a light from a light source to a plurality of directions, the lens structure comprising:
    a base having a containing pit configured to contain the light source;
    a pillar connected to the base and having a central axis and a first curved surface, wherein the first curved surface surrounds the central axis symmetrically;
    a bent surface located between the first curved surface of the pillar and the base; and
    an umbrella-shaped body connected to the pillar and having a second curved surface and a third curved surface surrounding the central axis symmetrically, wherein the second and the third curved surfaces are located on a top portion of the umbrella-shaped body and next to each other.

2. The lens structure as claimed in claim 1, wherein the first curved surface is a total internal reflection (TIR) surface configured to reflect the light from the light source towards the umbrella-shaped body.

3. The lens structure as claimed in claim 1, wherein on a projection plane with the central axis serving as a normal, an orthogonal projection of the second curved surface onto the projection plane is surrounded by an orthogonal projection of the third curved surface onto the projection plane.

4. The lens structure as claimed in claim 1, wherein the second curved surface is a convex surface, and the third curved surface is a concave surface.

5. The lens structure as claimed in claim 1, wherein a portion of a light emitted to the second curved surface transmits through the second curved surface, and another portion of the light emitted to the second curved surface is reflected by the second curved surface towards a side edge of the umbrella-shaped body.

6. The lens structure as claimed in claim 1, wherein a portion of a light emitted to the third curved surface transmits through the third curved surface, and another portion of the light emitted to the third curved surface is reflected by the third curved surface towards a side edge of the umbrella-shaped body.

7. The lens structure as claimed in claim 1, wherein the umbrella-shaped body further comprises a first slanted surface and a second slanted surface surrounding the central axis symmetrically and respectively located at a side edge of the umbrella-shaped body, the first slanted surface located next to the third curved surface, the second slanted surface located between the first slanted surface and the first curved surface, and the first slanted surface intersects with the second slanted surface to form an included angle.

8. The lens structure as claimed in claim 3, wherein the umbrella-shaped body further comprises a third slanted surface surrounding the central axis symmetrically and located on a bottom portion of the umbrella-shaped body, and the third slanted surface and the projection plane form an acute angle of 0 degree to 15 degrees.

9. The lens structure as claimed in claim 1, further comprising a plurality of fixing holes disposed on the base.

10. The lens structure as claimed in claim 1, further comprising a plurality of adhesive portions disposed on the base.

11. The lens structure as claimed in claim 1, wherein the second curved surface is a concave surface, and the third curved surface is a convex surface.

12. The lens structure as claimed in claim 1, wherein the containing pit is a portion of a ball body, and the light source is located on the central axis.

* * * * *